United States Patent [19]

Rowell

[11] 3,863,238
[45] Jan. 28, 1975

[54] DUAL GROUND INTEGRITY MONITORING CIRCUIT

[75] Inventor: William G. Rowell, Canton, Mass.

[73] Assignee: Honeywell Inc., Minneapolis, Minn.

[22] Filed: Sept. 3, 1971

[21] Appl. No.: 177,794

Related U.S. Application Data

[62] Division of Ser. No. 865,457, Oct. 10, 1969, Pat. No. 3,611,053.

[52] U.S. Cl. ............................................. 340/255
[51] Int. Cl. ......................................... G08b 21/00
[58] Field of Search........... 340/255; 317/123, 18 R, 317/18 A, 18 B, 18 C, 18 D; 324/51

[56] References Cited
UNITED STATES PATENTS

| | | | |
|---|---|---|---|
| 2,999,189 | 9/1961 | Gerrard | 340/255 X |
| 3,278,802 | 10/1966 | Fanin et al. | 317/18 R |
| 3,611,053 | 10/1971 | Rowell | 317/123 |

Primary Examiner—Donald L. Yusko
Assistant Examiner—Daniel Myer
Attorney, Agent, or Firm—Philip J. Zrimsek

[57] ABSTRACT

A circuit for use with a sensor located in a hazardous area such as in an atmosphere of explosive gases, organized to prevent electrical power at the sensor from exceeding prescribed levels even upon reasonably foreseeable failures of parts of the circuit. The circuit, which is located in a non-hazardous area, includes an indicator, such as a relay-controlled alarm, to respond to the sensor, and terminals for connection to a source of line voltage. Two voltage step-down transformers have their secondaries connected in series with one another and with the sensor. The primary of one transformer is connected to the line voltage source; and the primary of the other transformer is connected to the indicator. Each transformer secondary lies intermediate a pair of current limiting resistors, and the primary and secondary windings of each transformer are isolated by means of a grounded conductive sheet. Each transformer, along with its associated current limiting secondary resistors, is embedded in potting material to form a self-contained isolating circuit module. The circuit is intended to be connected to a remote ground terminal as well as the ground terminal of the line voltage source. A ground integrity detector circuit interrelates these three terminals by means of resistances and a neon glow tube to provide a signal whenever one of the ground circuits is lost, as well as a signal upon failure of one of the resistances forming the ground integrity detection circuit. The remote ground connection has a path extending through the circuit chassis to insure that its ground is maintained.

1 Claim, 5 Drawing Figures

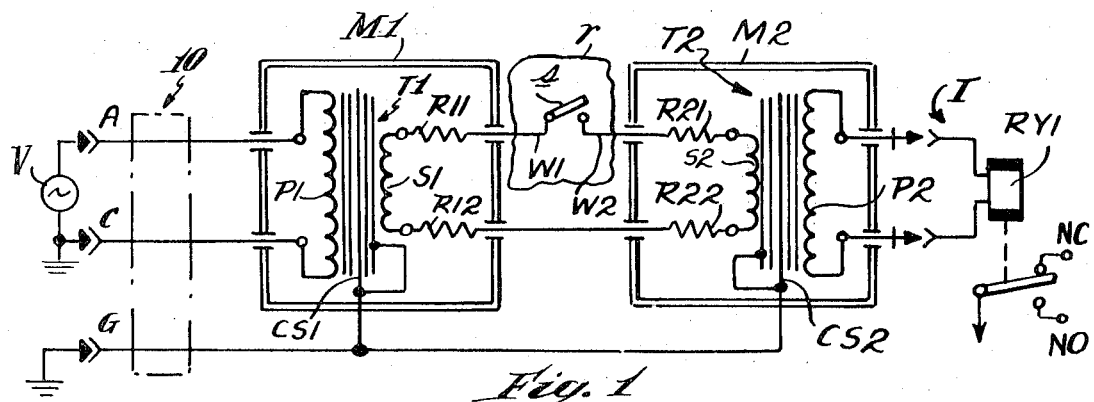
Fig. 1
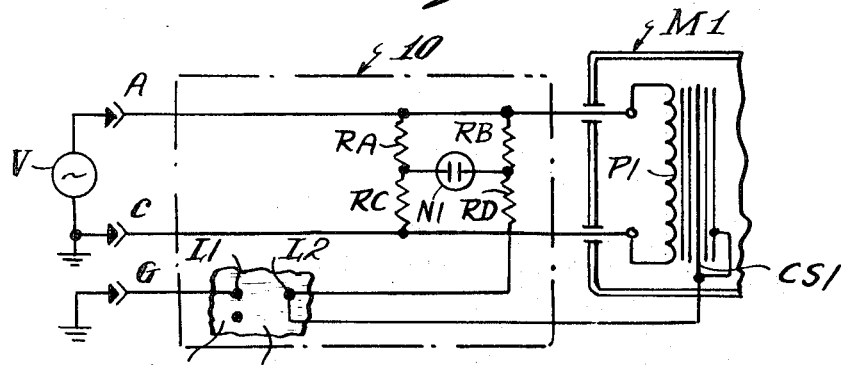
Fig. 2
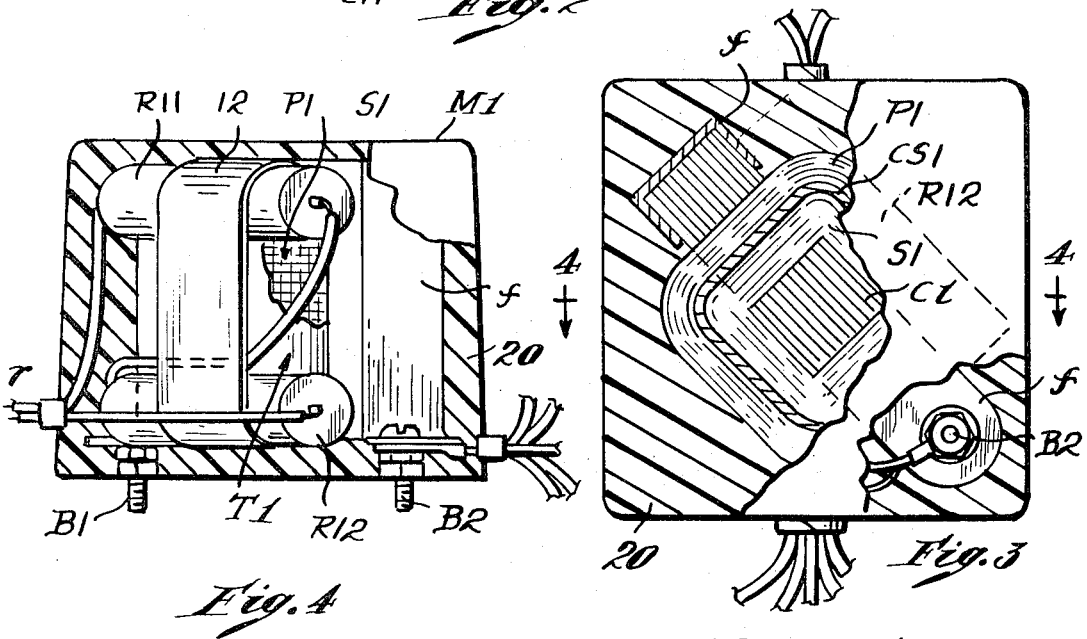
Fig. 4
Fig. 3
Inventor
William G. Rowell
by
Att'ys.

DUAL GROUND INTEGRITY MONITORING CIRCUIT

This is a division of application Ser. No. 865,457, filed Oct. 10, 1969 now U.S. Pat. No. 3,611,053.

BACKGROUND OF THE INVENTION

The field of the present invention relates to electrical components and circuits which are designed for use, at least in part, in hazardous areas which involve, for example, the presence of explosive atmospheres which require only a very low energy electrical discharge for ignition. Circuitry which does not exceed prescribed ignition energy levels whenever reasonably foreseeable failures occur in the circuit, is known in the art as "intrinsically safe."

Hazardous atmospheric mixtures as defined in this art include all explosive or ignitible air mixtures involving gases or vapors at atmospheric pressure and with ambient temperatures between zero and 102° F. The order of ignitibility of materials generally corresponds to the national electrical code groupings, for which typical examples are: Group A- Acetylene (8.7 percent by volume); Group B - Hydrogen (21.0 percent by volume); Group C - Ethylene (7.8 percent by volume); and Group D - Methane (8.2 percent by volume). The minimum ignition energy for any of these flammable mixtures is the least required energy sufficient to ignite the mixture at 0 psig. The most easily ignited air mixture is that mixture of a flammable material in air which requires the minimum amount of energy for ignition.

Approval standards for intrinsically safe equipment have been established by nationally recognized testing laboratories, and testing procedures have been developed to determine if the standards are met. Intrinsically safe electrical equipment and associated wiring, by definition, are incapable of releasing sufficient electrical or thermal energy under normal or abnormal conditions to cause ignition of a specific hazardous mixture in its most easily ignited concentration. The ignition capability of a circuit depends on the electrical energy available and rate of release in spark form, by contact fusing, or through resistive heating effects. There are three basic mechanisms by which electrical energy may be released in spark discharge form: discharge of a capacitive circuit, interruption in an inductive circuit, and make-break of a resistive circuit. Abnormal operating conditions, under which intrinsically safe equipment must function properly, usually are defined by any two mechanical or electrical faults occurring in combination. The faults are independent and include accidental damage to, and failure of, components or wiring.

The faults which give rise to abnormal operating conditions are any of the broad category of abnormalities that can occur in equipment. Of particular importance are those which change the characteristics of an electrical circuit. These include, but are not limited to, component and circuit failures or malfunctions in equipment or wiring. Subsequent electrical failures of components resulting from an initial fault are considered to be part of that initiating fault.

A number of design criteria are known for intrinsically safe circuits. For example, all components are conservatively rated. Resistors, for example, are used at no more than 50 percent of their power ratings. Circuits may be designed to operate on such low voltage as to be intrinsically safe without special energy limiting techniques; however, additional energy limiters such as resistors are often necessary. Shunting components (capacitors, resistors, or diodes) may be used electrically in parallel with an inductive component. Encapsulation of components indirectly limits energy release. Encapsulation can prevent a short-circuit condition involving external means but not an open circuit condition. Encapsulation also can assure that any energy release of capacitance will be through the intended circuit impedance in series with it. The addition of a circuit component can sometimes make a circuit intrinsically safe by increasing to three the number of faults necessary for an unsafe condition. Acceptable examples of this technique are: a single resistor replaced by two in series, a single capacitor replaced by two in parallel, an electrical ground added to the core of a transformer, and two properly insulated conductors separated by a barrier, or each secured in place with space separation. According to safety standards, a transformer secondary circuit is treated as normally operating on primary voltage unless both of the following conditions are met: primary and second windings are physically separated in a manner which effectively prevents the primary voltage from being impressed on the secondary circuits, for example, by separating primary and secondary windings with a grounded metal barrier; and the transformer is capable of withstanding a burnout test without short-circuiting.

The foregoing expedients are highly useful, but not always sufficient to permit the design of an intrinsically safe circuit. The purpose of the present invention is to supply additional ways of providing an intrinsically safe circuit, and to provide components and circuits useful therein which are simple, inexpensive, and reliable.

SUMMARY OF THE INVENTION

The circuit according to the invention monitors a sensor, e.g., a pressure actuated switch, located in a hazardous environment. The circuit comprises conductors extending from the sensor to a non-hazardous area, a source of line voltage in the non-hazardous area, and indicator means, e.g., a relay-controlled device, responsive to the sensor, also located in the non-hazardous area. A first voltage step-down transformer has its primary connected to the line voltage source and a second voltage step-down transformer has its primary connected to the indicator means, for example, the winding of a relay. The secondaries, of said first and second step-down transformers are connected in series with each other and, through the conductors, with the sensor located in the hazardous area. Because the back to back transformers cause a voltage step-down into the hazardous area, faults arising in the non-hazardous area will not be reflected into the hazardous area with a sufficient energy discharge to cause ignition. To further reduce the possible energy discharge in the hazardous area, in preferred embodiments each transformer secondary is connected in series between a pair of current limiting resistors, the primary and secondary windings of each transformer are physically isolated, for example, by a grounded conductive sheet, and the transformer core also is grounded.

In a further aspect of the invention, the circuit employs a pair of isolation modules which are interposed between circuitry in the hazardous area and additional circuitry in the non-hazardous area. Each isolation module comprises a voltage step-down transformer having its primary terminals connected to circuitry in the non-hazardous area, and a secondary having its terminals connected to circuitry in the hazardous area. In the module, each secondary winding is connected between current limiting resistors, the transformer windings are isolated, for example, by a grounded conductive sheet, and the transformer core is grounded. The transformer and the current limiting resistors of each module are embedded in a volume of potting material, such as a thermosetting resin base epoxy, which effectively isolates these components from contact with fault producing objects outside or within the module.

In a still further aspect of the invention, the circuit employs not only the line ground (paired with the "live" or active voltage terminal in the line voltage source) but also a remote ground of the chassis. The two grounds are monitored by a ground integrity indicator, which comprises a voltage threshold indicator, for example a neon glow tube. Thus, the resistors RA, RB are connected between the ungrounded "live" voltage terminal A and the neon glow tube indicator NI. The resistor RC is connected between the glow tube and the line voltage ground terminal C, whereas the resistor RD is connected between the glow tube and the remote ground terminal G through the chassis. The neon threshold voltage indicator is connected between the junctures of the resistor pairs in a bridge circuit configuration. Upon loss of either the voltage source ground or the remote ground, or upon the shorting or opening of any of the resistors forming the two resistor pairs, the threshold voltage indicator will signal the fault and enable remedial measures to be taken.

These and other objects and novel aspects of the invention will become apparent from the following description of preferred embodiments.

DESCRIPTION OF THE DRAWINGS

FIG. 1 is a schematic diagram of intrinsically safe circuitry according to the invention;

FIG. 2 is a schematic diagram of a portion of FIG. 1, showing details of the ground integrity detection circuit;

FIG. 3 is a bottom view of an isolation module according to the invention;

FIG. 4 is a section on line 4—4 of FIG. 3; and

DESCRIPTION OF THE PREFERRED EMBODIMENTS

Figure 5:
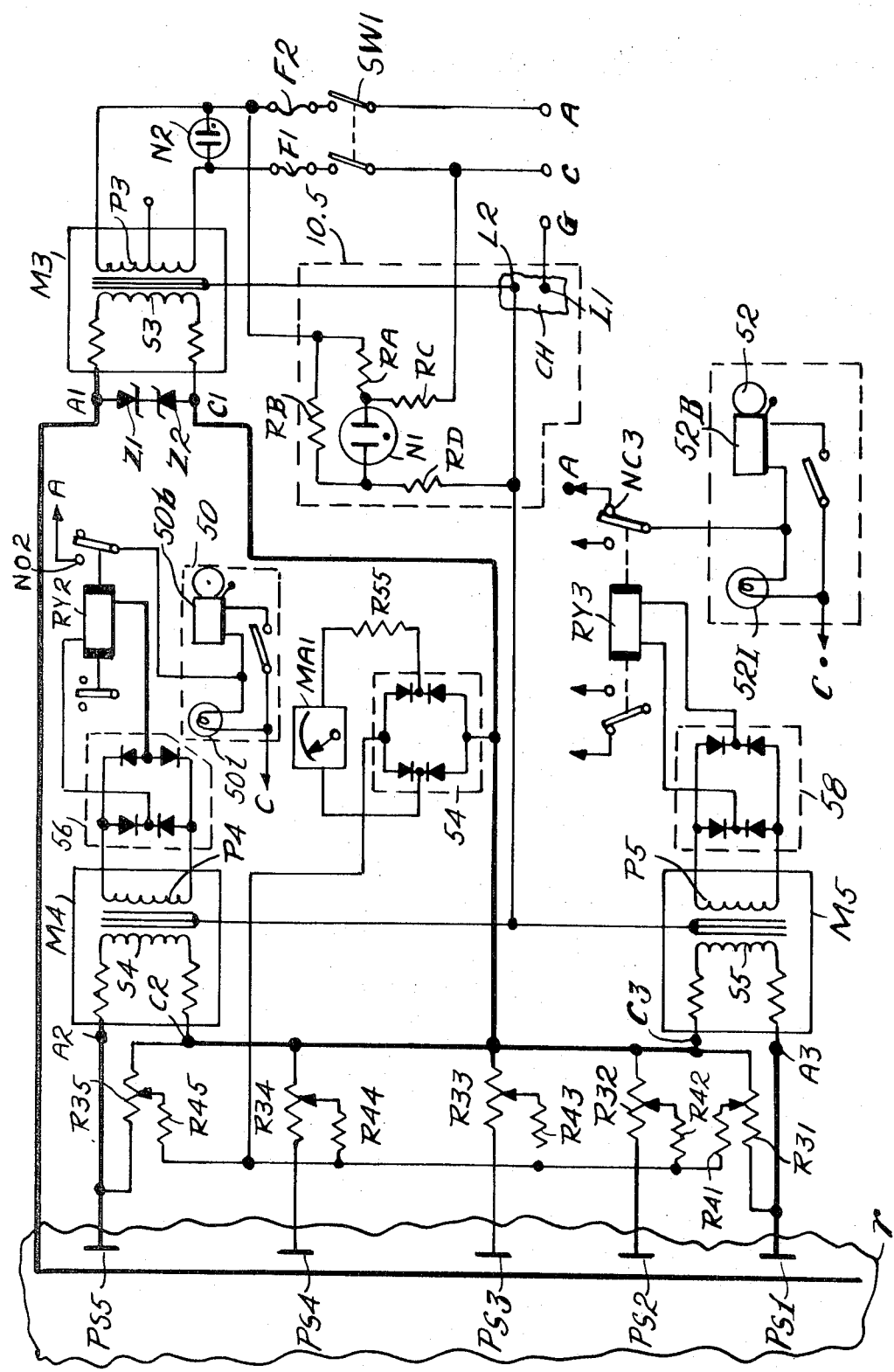
FIG. 5 is a schematic diagram of a level detection device employing the intrinsically safe circuit of the present invention.

A circuit with intrinsically safe characteristics is illustrated in FIG. 1. A sensor s, located in a hazardous region r, is to be monitored by the circuit. Indicating means I, located outside the hazardous region r, respond to the condition of the sensor s to provide an external indication of whatever property in the hazardous region the sensor s is designed to probe. Sensor s can be a switch, such as the pressure actuated switch disclosed in copending application Ser. No. 819,149, filed Apr. 25, 1969 and also disclosed in connection with a level detecting system in FIG. 5 to be described hereinafter. Sensor s may also be of another type which, for example, produces a change in resistance or impedance in a continuous fashion instead of discontinuously as does a switch, or it may be of another type capable of producing a change in electrical characteristics in response to the changes in the property it senses. The indicating means I, illustrated as a relay RY1, will be selected to be compatible with the form of sensor s to be utilized. The illustrated relay RY1 is adapted to switch from normally closed contact NC to normally closed contact NC to normally open contact NO when the sensor s changes from an open to a closed circuit.

The hazardous region r is, as indicated previously, an explosive or ignitable air mixture involving gases or vapors, or some other environment which would become dangerous upon the release of a sufficient electrical or thermal energy therein. The national electrical code groupings given above provide a representative sample of such hazardous regions.

The intrinsically safe circuit of FIG. 1 is provided with plug connector terminals A, C for connection to a source of alternating line voltage V. One terminal C functions as ground for the alternate line voltage. Another plug connector terminal G is provided for connection to a remote ground as shown. A typical 120 volt, three wire line is a suitable voltage supply for the circuit. A ground integrity circuit 10, described below with reference to FIG. 2, provides means for detecting the loss of a ground circuit through either of terminals C or G, or the chassis itself, when use is made of a preferred chassis grounding arrangement.

The sensor s is isolated from the line voltage at terminals A, C and from the indicating means I through the provision of isolation modules M1 and M2. Module M1 comprises a transformer T1 having a primary P1 connected to the ground integrity indicator 10 and to the voltage supply terminals A, C; and a secondary S1 which is connected in series between a pair of current limiting resistors R11 and R12. A conductive sheet CS1 is disposed between the primary and secondary windings thereby acting as a barrier to prevent the primary voltage from falsely being impressed across the secondary. The conductive sheet CS1, and the transformer core, are connected to a chassis ground lug L2. As described below in connection with FIG. 2, the ground integrity circuit 10 is connected to a different chassis ground lug. Therefore the ground checking circuit includes a part of the chassis which insures that the chassis is grounded and so checked. Isolating module M2 is similar in construction to M1, having a corresponding transformer T2, primary P2, secondary S2, current limiting resistors R21 and R22, and grounded conductive sheet CS2 and core. The primary P2 of module M2 is connected across the winding of the electromagnetic relay RY1.

The secondaries S1 and S2 are connected in series with each other, and in series with sensor s, through resistors R11, R12, R21, and R22, and also through conductors W1 and W2 which lead respectively from the hazardous region r to the modules M1 and M2. The transformers T1 and T2 both step-down voltage from primary to secondary in a ratio producing an acceptably low voltage in the hazardous region r. A step-down ratio of 120:15 has produced acceptably low voltages when the line voltage source is 120 volts, and when resistors R11, R12, R21 and R22 are each of 25 ohms.

By virtue of the back to back transformer arrangement described above, it can be seen that faults occurring in the region of terminals A, C, or faults occurring at indicator means I, will be reflected into the hazardous region r with considerably diminished energy that can safely be discharged there. The step-down transformers T1 and T2 provide low voltage, and the current limiting resistors R11, R12, R21 and R22 provide low current, and together the two provide a low power product. It should be observed that while the present invention guarantees safety in the hazardous region r, it also permits devices such as relay RY1 to be operated at a high voltage by reason of the voltage step-up from the secondary S2 to primary P2 in transformer T2 and thus without requiring the use of an amplifier and an additional voltage source which can lead to the imposition of additional faults into the hazardous region r.

FIG. 2 illustrates ground integrity circuit 10, and shows how it is incorporated with the remainder of the circuitry of FIG. 1. The ground integrity circuit 10 comprises a series connected pair of resistors RA, RC connected between line voltage terminals A and C; a second pair of series connected resistors RB and RD connected between terminal A and ground terminal G through a conductive portion of mounting chassis OH by means of independent connector lugs L1 and L2 located thereon. Lug L1 is connected to the remote ground terminal G and lug L2 is connected to the ground wires of the circuitry. A voltage responsive device, such as a neon glow tube N1, is connected between the junction of the first resistor pair RA, RC and the junction of the second resistor pair RB, RD. It can be readily appreciated that if resistors RA and RB are equal in value, and if resistors RC and RD are equal in value, then under normal operating conditions the voltage drop CH resistor RA will be the same as the voltage drop across resistor RB and thus there will be no voltage across the neon glow tube N1 and it will give no signal. However, if one of the grounds, for example at terminal C, should become open circuited, the circuit balance will be lost, and a voltage will be impressed across the neon glow tube, causing it to light up and signal the defect. Similarly, if the ground at terminal G becomes open circuited or if the mounting chassis CH becomes disconnected from either one of lugs L1 or L2, then the glow tube N1 would also signal the defect. Ground integrity circuit 10 is also self-policing, since if any one of the resistors RA, RB, RC, or RD should either short out or become open circuited, then again circuit balance is lost with the result that glow tube N1 will signal the defect. Thus ground integrity circuit 10 provides a means, itself safe, for showing whether the circuit is functioning in a proper manner. Instead of using neon glow tube N1 to signal the defect, another voltage responsive device such as a voltage sensitive relay or other switching means could be used to give the signal or to initiate power cut-off to prevent accidents. While the ground integrity circuit 10 as shown in FIG. 2 uses the mounting chassis CH as part of one ground path, this expedient is optional and could be omitted if, for example, no part of the chassis were used to connect to or to form a ground circuit.

The basic circuit illustrated in FIG. 1 is made safer by constructing the isolation modules M1 and M2 in the manner illustrated in FIGS. 3 and 4. For convenience, the numerals applied to isolation module M1 in FIG. 1 will be used in describing FIGS. 3 and 4. As shown there, transformer T1 has a frame f which supports the stack of thin laminated sheets which form the transformer core. Around the center leg cl of the core, the primary and secondary windings P1 and S1 are wound, with conductive copper sheet CS1 therebetween. Alternatively, the primary and secondary windings can be wound on the core side-by-side with a barrier of insulative material, such as 1/32 inch thick phenolic or melamine resin shields, separating the adjacent ends of the windings. Resistors R11 and R12 are secured to the transformer by means of pressure sensitive tape 12 wrapped therearound. Wires are provided to connect the secondary S1 with the resistors R11 and R12 and also to provide leads to the outside of the module from resistors R11, R12 and primary P1, conductive sheet CS1 and the transformer core ground. Bolts B1 and B2 are secured to the frame f to provide a means for mounting the isolation module M1 to a mounting chassis, such as chassis CH of FIG. 2. The transformer T1 and resistors R11 and R12 along with interconnecting wires, are encapsulated in potting compound 20, e.g., a thermosetting resin base epoxy, which serves to prevent accidental contact of any of these components with each other or with external fault producing items such as live wires, sharp objects, intense flames, and the like. The potting material 20 also prevents mechanical failure such as vibratory fracture of connecting wires between the secondary S1 and the resistors R11 or R12.

FIG. 5 illustrates a highly practical application of the intrinsical safe circuit of this invention. The circuit is used to monitor the condition of a level sensing device which employs pressure sensitive switches PS1 through PS5 disposed at different heights in a tank located in a hazardous region r. Switches PS1 through PS5 can be as disclosed in the above-mentioned copending application.

The circuit of FIG. 5 is supplied through terminals A, C from a source of 115 volt alternating current. It includes a switch SW1, tandem fuses F1 and F2, and a shunting neon glow tube N2 for indicating when voltage has been applied to the input terminals of an isolation module M3 which is identical with module M1 and M2 of FIG. 4. The module M3 steps down the 115 volt current at its primary P3 to a value conforming to safety regulations and applies it to output terminals A1, C1 across which are connected two opposed Zener diodes Z1 and Z2 functioning to regulate the voltage at output terminals A1, C1. The stepped down voltage across terminals A1, C1, forms a separate series circuit with each of the switches PS1 to PS5 through potentiometers R31 to R35, respectively. These potentiometers have intermediate taps connected through resistors R41 through R45, respectively, to a common input terminal of a full wave rectifier 54, the other input terminal of which leads to terminal C1. The full wave rectifier 54, which is a diode bridge as illustrated, drives a d-c milliammeter MA1 through a resistor R55. The closure of switches PS1 through PS5, upon changes in level in the tank, changes the total resistance of the parallel branch resistance network which controls the current through the indicating milliammeter MA1. The potentiometers R31 to R35 are tapped such that the closing of successive switches PS1 through PS5 produces roughly equal swings of the milliammeter needle.

The circuit of FIG. 5 is equipped with a high alarm 50 and a low alarm 52 for indicating overfilling and emptying of the tank, respectively. Use of one or both of the alarms provides warning of an undesirable condition and enables remedial measures to be taken. The high alarm 50 and the low alarm 52 are controlled by the topmost switch PS5 and bottommost switch PS1, respectively. Similar alarms might be used at intermediate levels if such levels are of critical importance. Connected in the manner shown in FIG. 5, the high alarm 50 gives a warning through buzzer 50B or light 50L when switch PS5 closes. Low alarm 52 gives a warning through buzzer 52B or light 52L when switch PS1 opens.

Upon closing, switch PS5 places the step-down voltage appearing at terminals A1, C1 at the input terminals A2, C2, of isolation module M4 (identical with modules M1, M2, and M3) which steps up the voltage to drive a relay RY2 after rectification by a full wave diode bridge rectifier 56. The relay RY2 has normally open contacts NO2 forming a series circuit with high alarm 50 and line voltage terminals A, C. When the switch PS5 closes, the relay contacts close to operate the alarm. In similar fashion, the closing of switch PS1 places the step-down voltage at terminals A1, C1 across the input terminals A3, C3 of isolation module M5 (identical with modules M1 through M4) which steps up the voltage to drive a relay RY3 after rectification by a full wave diode bridge rectifier 58. The de-energized relay RY3 has normally closed contacts NC3, as shown, forming a series circuit with the low alarm 52 and line voltage terminals A, C. When switch PS1 opens, to indicate emptying, the relay RY3 de-energizes and the normally closed contacts NC3 of relay RY3 close and operate the low alarm 52.

A ground integrity detector 10.5, identical with the ground integrity detector 10 described with reference to FIG. 2 above, is connected to line voltage terminals A, C, and remote ground terminal G.

The above described elements have their connections clearly shown in FIG. 5. For a more complete disclosure of the elements, their exact structural characteristics or dimensions or ratings so far as material for the proper operation of the device, are identified in the following list which refers to the numerals of FIG. 5, it being understood that adjustments and mutual correlations may have to be applied upon initial testing for proper performance, according to routine practice in manufacture of devices of this type.

| | |
|---|---|
| R31 – R35 | 1K ohms |
| R41 – R45 | 470 ohms |
| R55 | 470 ohms |
| Z1, Z2 | 1N1734 (5.6 volts) |
| RY2, RY3 | "Life Instrument Co.," 2500 Ohm coil, de, DPDT |
| MA1 | "Simpson" DC milliammeter model 1329 No. 6490, 0–5 milliammeters range |
| Rectifiers 54, 56, 58 | Diode bridge composed of 4 diodes, type Motorola molded rectifier bridge No. MDA 942-2 |
| RA,RB,RC,RD | Standard resistors of equal values |

From the foregoing description, the advantages of intrinsically safe circuitry according to the invention should be evident. Sensors, such as the switches PS1 through PS5 can be placed in extremely hazardous environments, and can be monitored using ordinary line voltages and indicating devices such as relays RY2 and RY3 operating on ordinary line voltages, without creating a possibility of dangerous energy discharge in the hazardous area. The hazardous area is protected from dangerous levels of voltage and current which arise either in the voltage source or on the indicating end. For example, if the voltage at terminals A, C applied to alarms 50 or 52 were to be accidentally impressed across the winding of relays RY2 or RY3, no dangerous level of voltage or current would appear in hazardous region r, and no ignition could occur because of the limiting effect of the resistors in the potted M4 and M5 modules.

I claim:

1. A circuit for monitoring a sensor located in a hazardous region and for monitoring the integrity of both line voltage ground and remote ground comprising:

conductors extending from the sensor to a non-hazardous region;

a source of line voltage in the non-hazardous region;

a first voltage step-down transformer having its primary connected to the voltage source;

indicating means responsive to the sensor and located in the non-hazardous region;

a second voltage step-down transformer having its primary connected to said indicating means;

the secondaries of said first and second transformers being connected in series with each other and in series with the sensor through said conductors;

a ground associated with said source of line voltage and a remote ground, a first series pair of resistances connected across said voltage source;

a second series pair of resistances connected between the ungrounded terminal of said voltage source and said remote ground; and voltage responsive means connected between the junctions of said pairs of resistances;

whereby faults arising in either the indicating means, the transformer primaries, or in the sensor or its conductors, present a substantially reduced energy discharge in the hazardous region and said pairs of resistance being valued such that loss of either ground will cause said voltage responsive device to indicate the loss.

* * * * *